United States Patent
Nusier et al.

(10) Patent No.: US 9,694,854 B2
(45) Date of Patent: Jul. 4, 2017

(54) VEHICLE STRUCTURAL REINFORCING DEVICE

(71) Applicant: Ford Global Technologies, LLC, Dearborn, MI (US)

(72) Inventors: Saied Nusier, Canton, MI (US); Mohamed Ridha Baccouche, Ann Arbor, MI (US); James Chih Cheng, Troy, MI (US); Jamel E. Belwafa, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 14/670,776

(22) Filed: Mar. 27, 2015

(65) Prior Publication Data
US 2016/0280273 A1    Sep. 29, 2016

(51) Int. Cl.
*B62D 21/15* (2006.01)
*B62D 21/03* (2006.01)
*B62D 25/20* (2006.01)

(52) U.S. Cl.
CPC .......... *B62D 21/157* (2013.01); *B62D 21/03* (2013.01); *B62D 25/2036* (2013.01)

(58) Field of Classification Search
CPC ...... B62D 21/157; B62D 21/03; B62D 23/00; B62D 23/005; B62D 25/20
USPC ........ 296/187.12, 204, 193.07; 280/784, 796
See application file for complete search history.

(56) References Cited

U.S. PATENT DOCUMENTS

| | | | |
|---|---|---|---|
| 2,517,272 A * | 8/1950 | Baghuis | B60G 3/01 280/124.118 |
| 5,482,344 A | 1/1996 | Walker et al. | |
| 5,755,484 A | 5/1998 | Chou et al. | |
| 6,209,948 B1 | 4/2001 | Mori et al. | |
| 6,237,991 B1 * | 5/2001 | Weber | B60N 2/4235 296/146.6 |
| 6,955,391 B1 | 10/2005 | Peng | |
| 8,123,276 B2 | 2/2012 | Subbian et al. | |
| 8,939,246 B2 * | 1/2015 | Yamaguchi | B62D 21/157 180/68.5 |
| 2005/0218696 A1 | 10/2005 | Aase et al. | |

FOREIGN PATENT DOCUMENTS

WO    WO 2007062110    5/2007

* cited by examiner

*Primary Examiner* — Glenn Dayoan
*Assistant Examiner* — Melissa A Black
(74) *Attorney, Agent, or Firm* — Jason Rogers; Bejin Bieneman (57) ABSTRACT

A vehicle chassis includes a pair of rails spaced from each other. A beam is disposed between the pair of rails and defines a cavity. The beam includes walls and hinges connected in alternating arrangement about the cavity. Each hinge is connected to two of the walls. A wedge is disposed between one of the rails and the beam adjacent the cavity for driving the walls and hinges toward an expanded position during a side impact.

20 Claims, 7 Drawing Sheets

VEHICLE STRUCTURAL REINFORCING DEVICE

BACKGROUND

Vehicles, such as automobiles, include a frame and a body supported on the frame. The frame may be designed to provide structural rigidity to prevent unwanted deformation and/or to prevent intrusion during an impact. For example, an electric vehicle includes a battery and the frame may be designed to reinforce a compartment in which the battery is supported. The frame may, for example, include a pair of rails spaced from each other and extending in a fore and aft direction to define the battery compartment between the rails. The battery may extend from one of the rails to another of the rails.

Structural rigidity of the rails may be important to limit the possibility of deformation in the vicinity of the battery and/or to prevent intrusion into the battery compartment. However, structure added to the frame, e.g., added to the rails, may disadvantageously create packaging constraints that do not accommodate the battery between the rails. Such added structure may also occupy space otherwise occupied by the cabin of the vehicle, thus disadvantageously decreasing the size of the cabin.

There remains an opportunity to provide reinforcement between the rails while minimizing packaging constraints in the battery compartment and in the cabin of the vehicle.

DETAILED DESCRIPTION

With reference to the Figures, wherein like numerals indicate like parts throughout the several views, a deployable reinforcing device 10 for a vehicle 12 is generally shown. The device 10 includes a beam 14 extending from a first end 16 to a second end 18. The beam 14 defines a cavity 20 extending from the first end 16 to the second end 18. The beam 14 includes walls 22 and hinges 30 connected in alternating arrangement about the cavity 20. Each hinge 30 is connected to two of the walls 22. A wedge 32 is disposed at the first end 16 of the beam 14 adjacent the cavity 20.

Figure 5A:
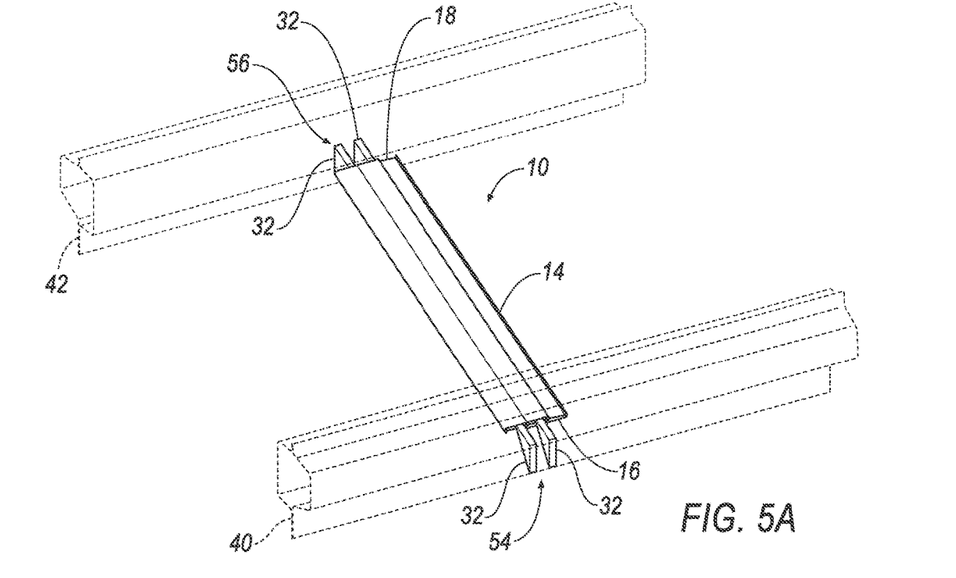
FIG. 5A is a perspective view of the deployable reinforcing device between the rails, shown in broken lines for illustrative purposes, with the deployable reinforcing device in a collapsed position.
Figure 5B:
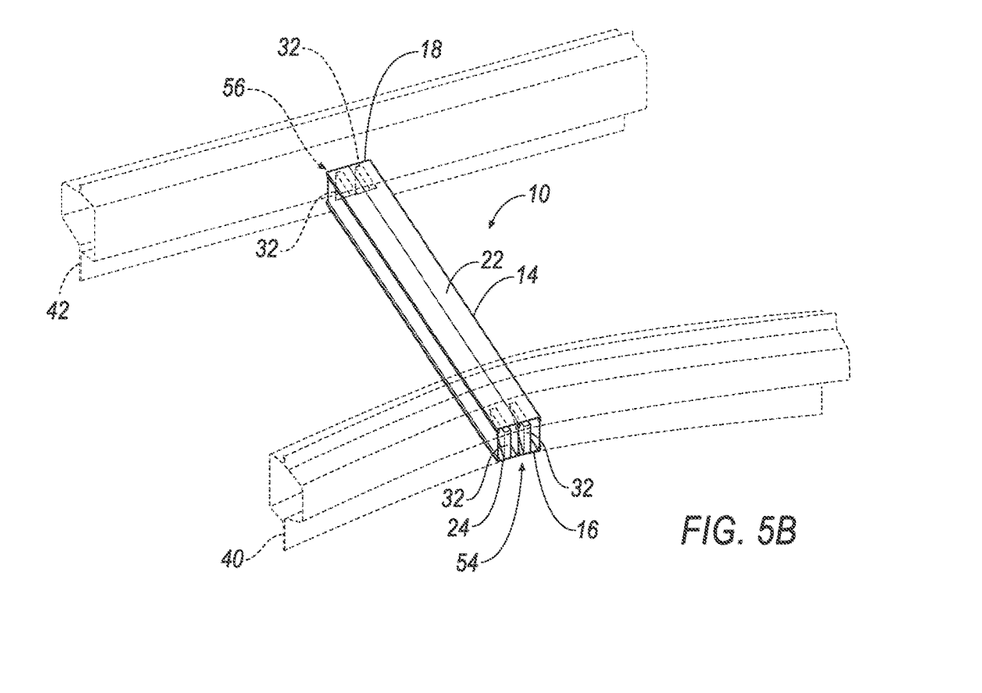
FIG. 5B is a perspective view of one of the rails being deformed by a side impact and the deployable reinforcing device in an expanded position.

With reference to FIGS. 5A-B, during a vehicle impact, the wedge 32 may be forced into the cavity 20 between the walls 22, 24, 26, 28 to rotate the walls about the hinges 30. In other words, the wedge 32 forces the beam 14 from a collapsed position, as shown in FIG. 5A, to an expanded position, as shown in FIG. 5B. In the expanded position, the beam 14 provides structural rigidity, as discussed further below. In the collapsed position, the walls 22, 24, 26, 28 and hinges 30 are collapsed relative to each other to reduce the size of the beam 14.

Figure 1:
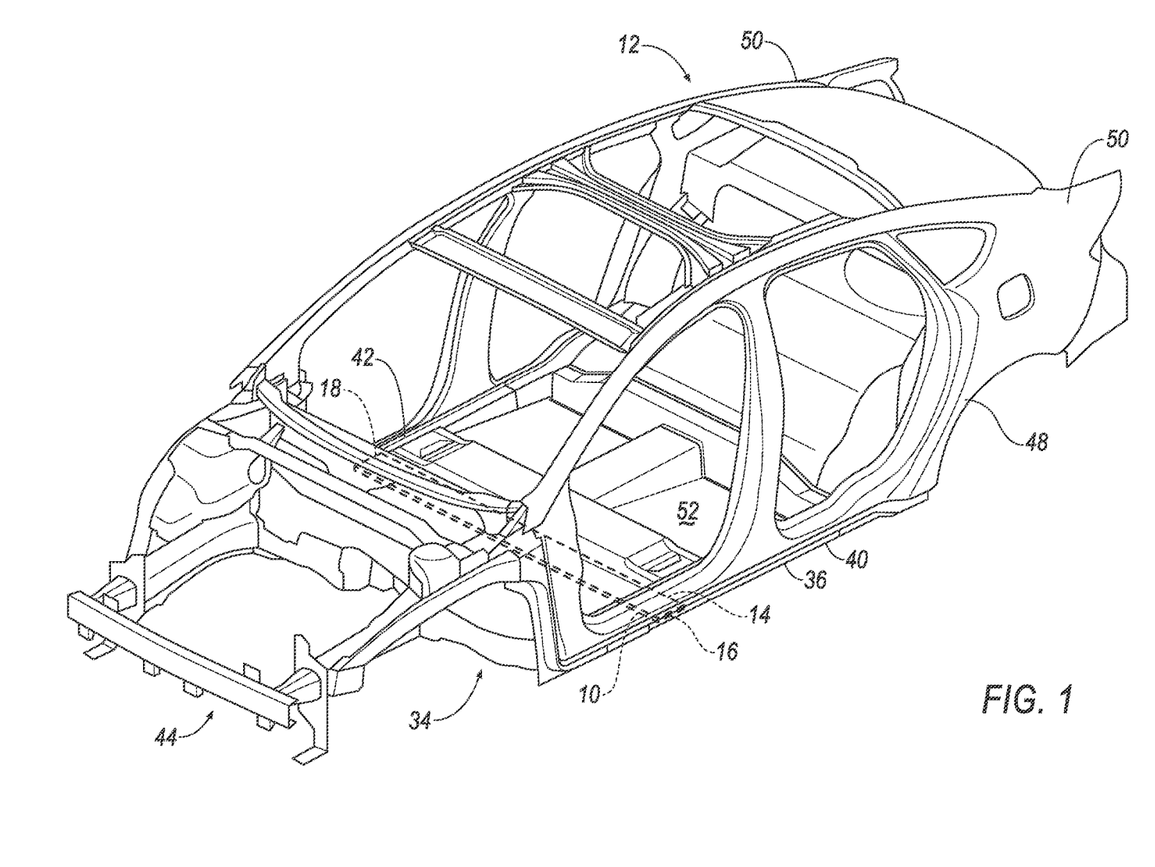
FIG. 1 is a perspective view of a portion of a vehicle including a body, a frame including two rails, and a deployable reinforcing device extending between the rails.
Figure 2:
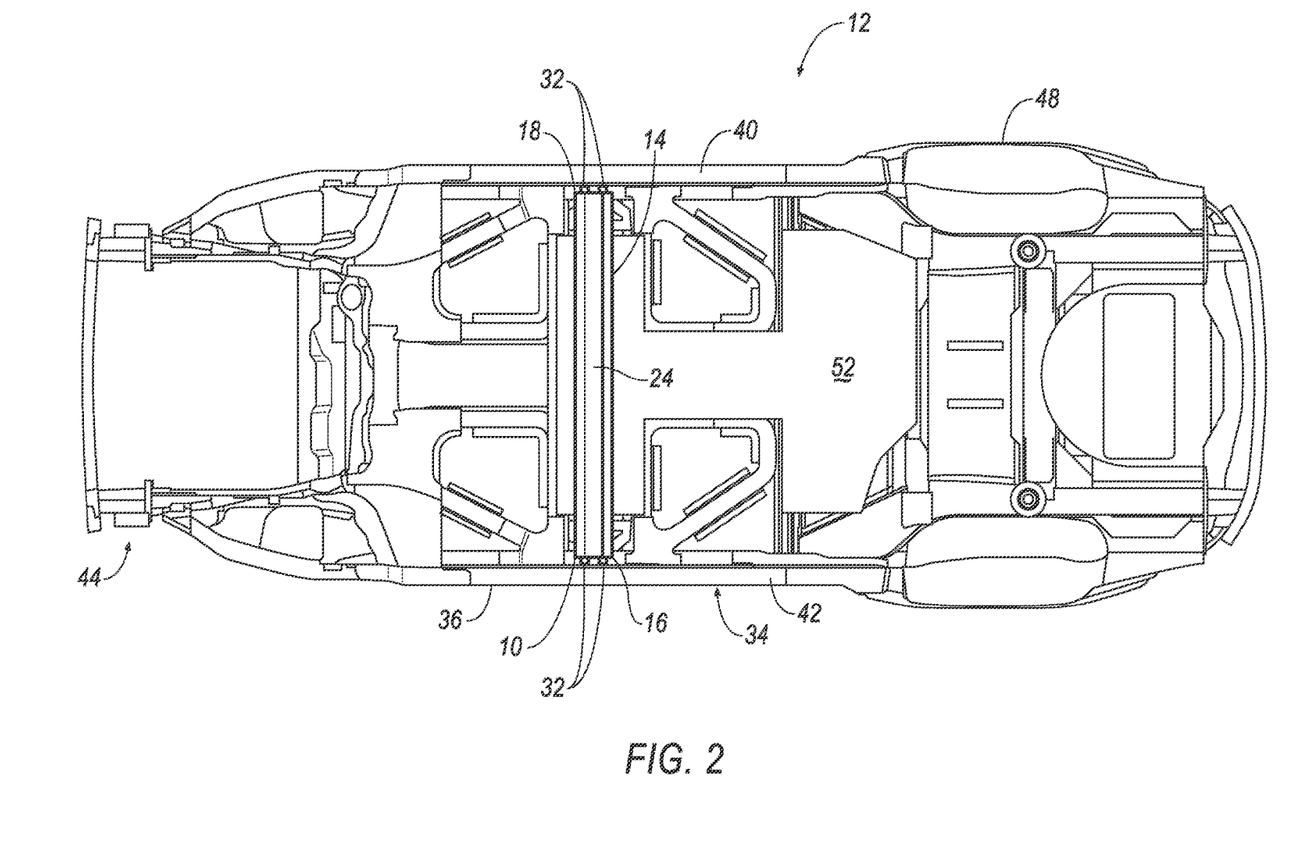
FIG. 2 is a bottom view of a portion of the vehicle.
Figure 3:
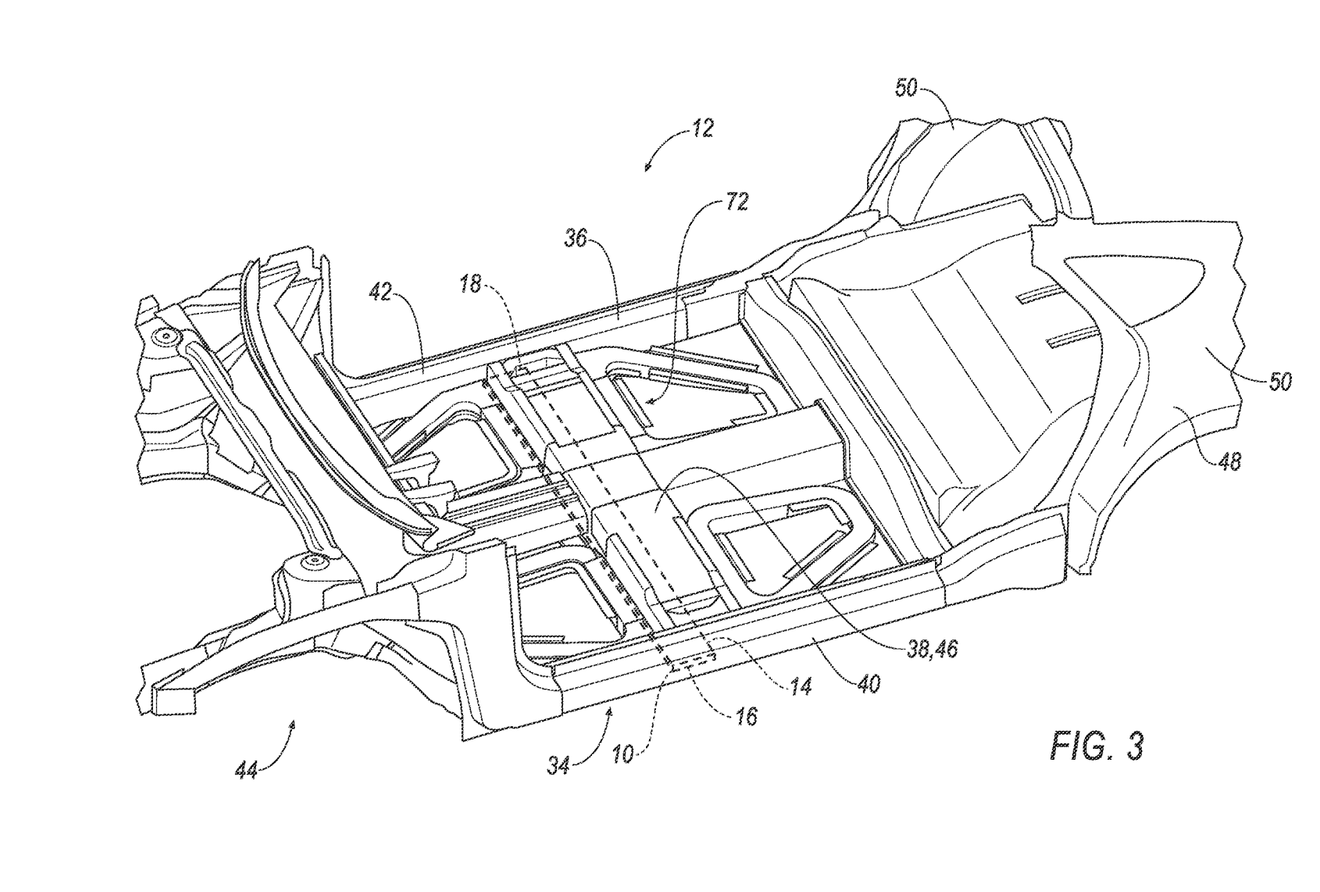
FIG. 3 is a perspective view of a portion of the vehicle with the floor removed for illustrative purposes showing a battery disposed above the deployable reinforcing device.

With reference to FIGS. 1-3, the vehicle 12 includes a chassis 34 including a frame 36 and a battery 38 (shown in FIG. 3). The frame 36 includes a pair of rails 40, 42, i.e., a first rail 40 and a second rail 42, spaced from each other and each extending in a fore and aft direction. The rails 40, 42 may extend generally in parallel with each other. In addition to the rails 40, 42, the frame 36 may include cross-members (not shown) extending between the rails 40, 42, an engine compartment 44, etc.

As set forth further below, the device 10 extends from the first rail 40 to the second rail 42. The device 10 may be supported by the first rail 40 and the second rail 42, e.g., the device 10 may be directly connected to the first rail 40 and the second rail 42, as set forth further below. In the expanded position, the device 10 reinforces the frame 36 of the vehicle 12, e.g., rigidly extends between the first rail 40 and the second rail 42 to reinforce the first rail 40 and the second rail 42. The device 10 may alternatively be disposed in any suitable location of the vehicle 12. For example, the device 10 may be disposed along pillars of the vehicle 12 such as the A-pillar, B-pillar, C-pillar, etc. In such a configuration, the device 10 may be forced to the expanded position when an axial force is applied to the pillar during a vehicle rollover to resist roof crush. As another example, the device 10 may be disposed along a roof bow and/or roof headers to reinforce a roof of the vehicle when the device 10 is forced to the expanded position to resist roof crush and/or crush resulting from side impact.

Figure 4:
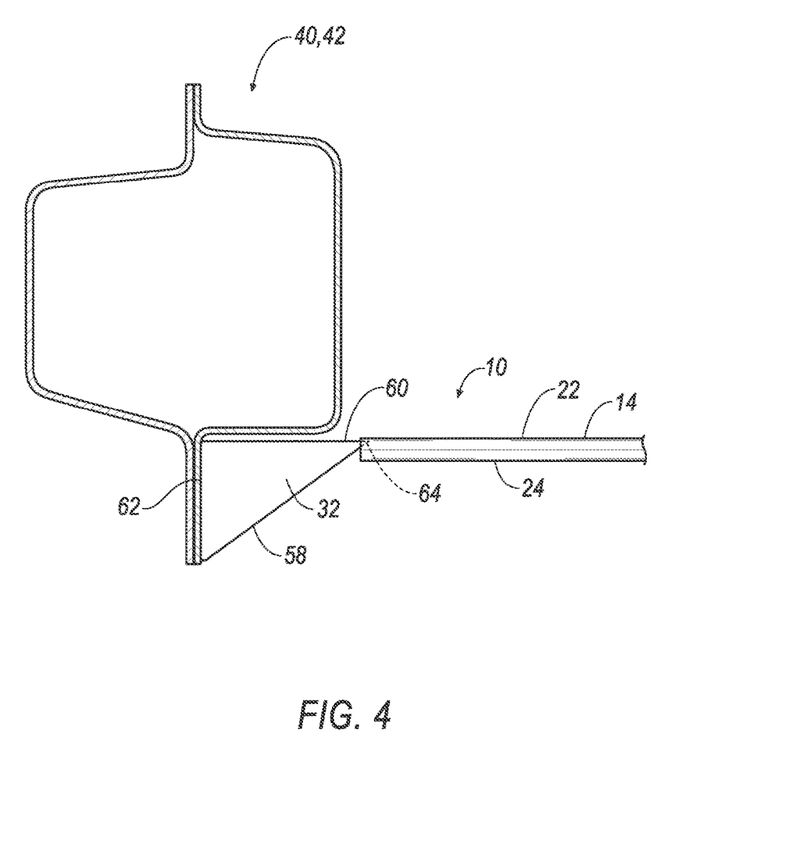
FIG. 4 is a cross sectional view of one of the rails and a portion of the deployable reinforcing device.

With reference to FIGS. 4-5B, the rails 40, 42 may have a generally rectangular cross-section. The rails 40, 42 may include two halves fixed together, e.g., by welding, as shown in FIG. 4, or alternatively may be a one piece unit or may include any suitable number of pieces. The rails 40, 42 may be formed from metal, such as steel or aluminum.

With reference to FIG. 3, the rails 40, 42 may define a battery compartment 72 between the rails 40, 42 and the battery 38 may be supported in the battery compartment 72. The battery 38 may be supported on the rails 40, 42, e.g., may include a box 46 (shown in FIG. 3) connected to one or both of the rails 40, 42. The battery 38 may extend from one of the rails 40, 42 to the other of the rails 40, 42. For example, the box 46 of the battery 38 may from one of the rails 40, 42 to the other of the rails 40, 42, as shown in FIG. 3.

With reference again to FIGS. 1-3, the vehicle 12 includes a body 48 supported on the frame 36. The body 48 may be supported on the frame 36 in any suitable fashion, e.g., welding. At least a portion of the body 48 may be supported on the rails 40, 42 of the frame 36. The frame 36 and body 48 may have a body-on-frame construction, a unibody 48 construction, or any other suitable construction.

The body 48 may include a plurality of panels. The panels may include side panels 50, a floor 52, etc. The panels, e.g., the floor 52, may be fixed to the rails 40, 42 of the frame 36. The body 48 may be formed of any suitable material such as steel, aluminum, etc. For example, the body 48 may be formed from sheets of suitable material, e.g., sheet metal.

The floor 52 may extend from one of the rails 40, 42 to the other of the rails 40, 42 beneath the battery 38. The battery 38, e.g., the box 46 of the battery 38, may be supported on and/or fixed to the floor 52 and/or rails 40, 42.

The device 10 may include any suitable number of wedges 32, e.g., one, two, or more. The device 10 shown in FIGS. 5A-B includes four wedges 32, e.g., a pair of wedges 54 and a second pair of wedges 56. Each of the wedges 32 shown in FIGS. 5A-B are identical and the pair of wedges 54 and the second pair of wedges 56 are arranged as mirror images. The wedges 32 may be formed of metal, plastic, or any other suitable material.

With reference to FIGS. 4 and 5, the pair of wedges 54 is disposed at the first end 16 of the beam 14 adjacent the cavity 20. The second pair of wedges 56 is disposed at the second end 18 of the beam 14 adjacent the cavity 20. Specifically, the pair of wedges 54 is disposed between the first rail 40 and the beam 14 adjacent the cavity 20, and the second pair of wedges 56 is disposed between the second rail 42 and the beam 14 adjacent the cavity 20.

The pair of wedges 54 and the second pair of wedges 56 may be supported by the first beam 14 and the second beam 14, respectively. For example, the pair of wedges 54 may be fixed to the first rail 40 and the second pair of wedges 56 may be fixed to the second rail 42, for example, by welding, bonding, or in any other suitable fashion.

With continued reference to FIGS. 4-5B, each wedge 32 may include a wedge surface 58 for wedging into the cavity 20 to move the beam 14 from the collapsed position to the expanded position. For example, the wedges 32 may be triangular in shape. In particular, each wedge 32 may include a first surface 60 extending in parallel with one of the walls 22, 24, 26, 28, a wedge surface 58 extending transversely from the first surface 60, and a rear surface 62 extending from the first surface 60 to the rear surface 62. The first surface 60 and the wedge surface 58 may intersect at an acute corner 64. The first surface 60d may be disposed at a top of the wedge 32 and, as such, may also be referred to as a top surface. The rear surface 62 may be fixed to the respective rail 40, 42. The first surface 60 may be spaced from the respective rail 40, 42 to accommodate the beam 14 as the wedge 32 moves into the cavity 20.

The wedge 32 may extend between the walls 22, 24, 26, 28 when the beam 14 is in the collapsed position. For example, as shown in FIGS. 4 and 5A, the first surface 60 and the wedge surface 58 may be disposed in the cavity 20 between the walls 22, 24, 26, 28 when the beam 14 is in the collapsed position. In other words, the corner 64 may be disposed in the cavity 20 between the walls 22, 24, 26, 28, when the beam 14 is in the collapsed position.

Figures 6, 7:
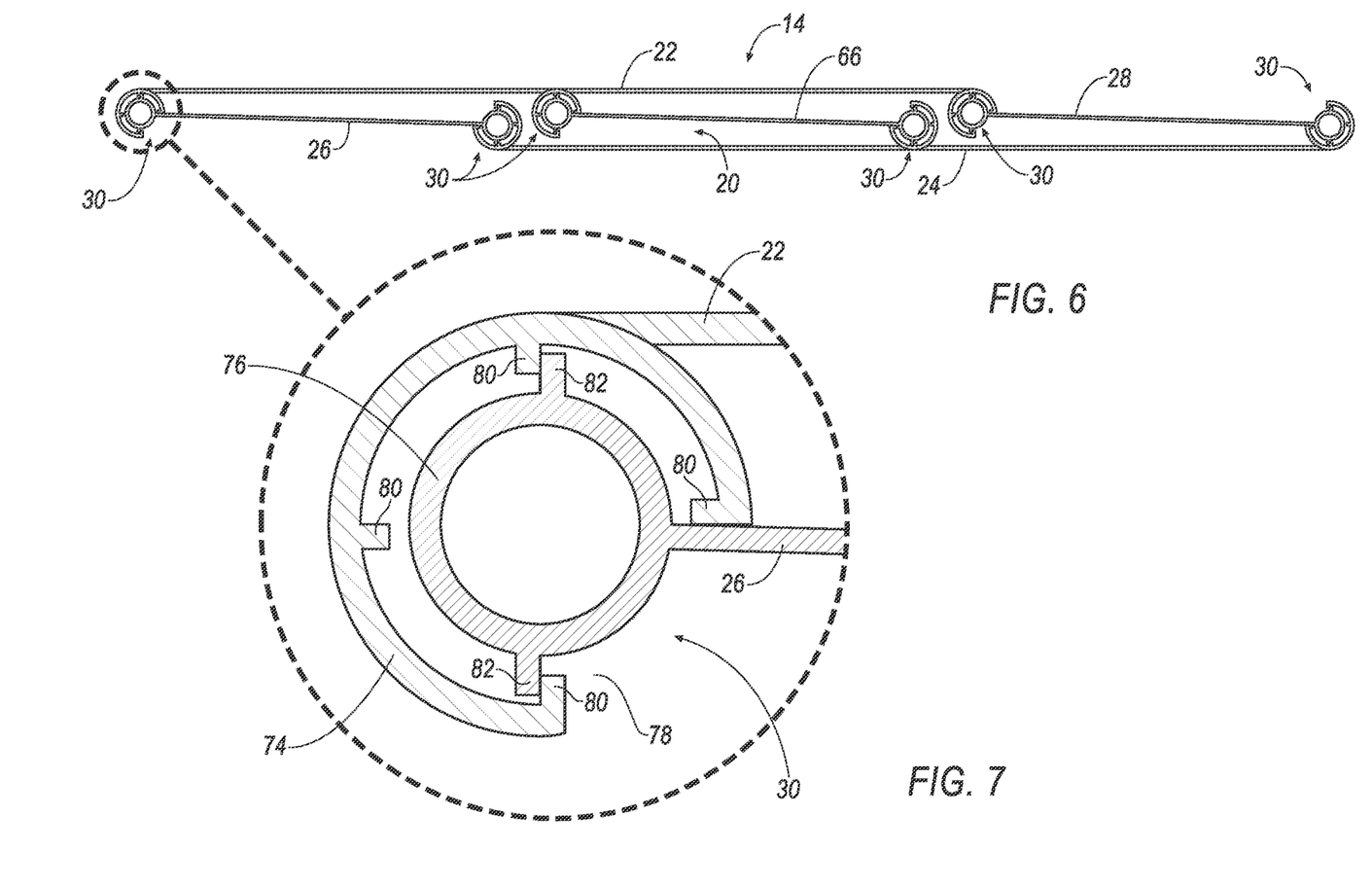
FIG. 6 is a cross-sectional view of the deployable reinforcing device in the collapsed position.
FIG. 7 is a magnified portion of a hinge shown in FIG. 6.
Figure 8:
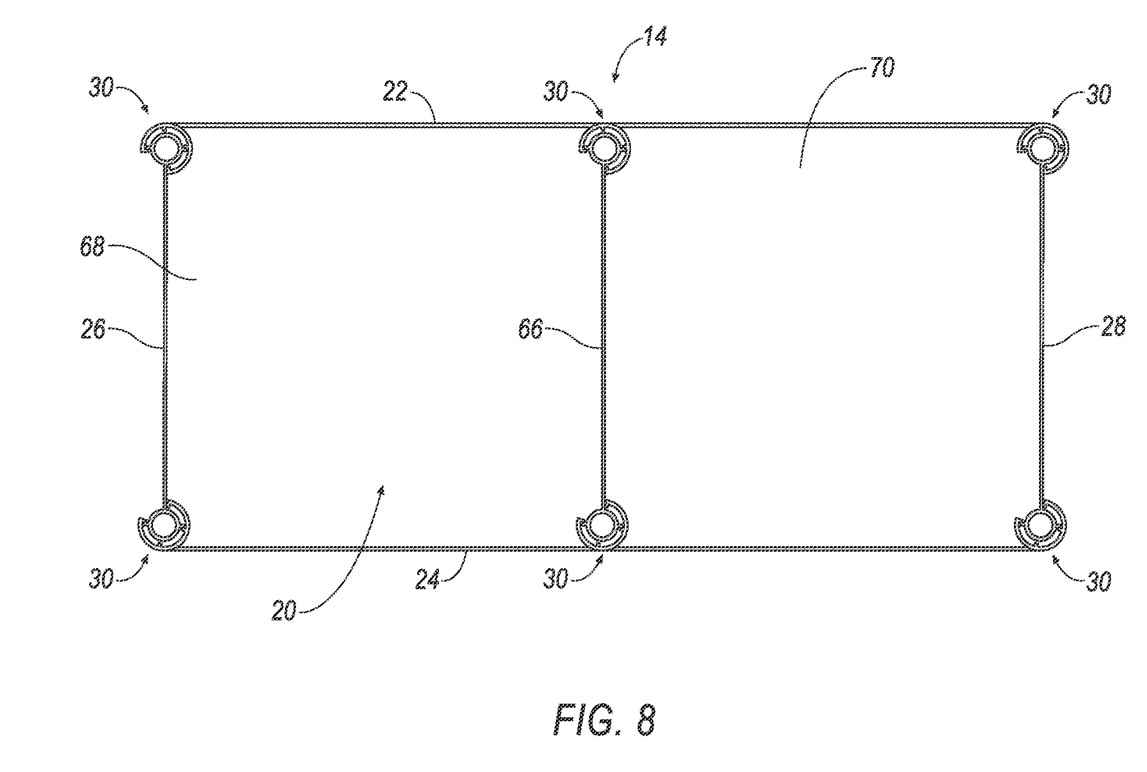
FIG. 8 is a cross-sectional view of the deployable reinforcing device in the expanded position.

With reference to FIGS. 6 and 8, the beam 14 may be rectangular in cross-section. In such a configuration, the beam 14 includes a top wall 22, a bottom wall 24 spaced from the top wall 22, and two side walls 26, 28 spaced from each other and extending from the top wall 22 to the bottom wall 24. The cavity 20 is defined between the top wall 22, the bottom wall 24, and the side walls 26, 28. As set forth above, the walls 22, 24, 26, 28 and hinges 30 connected in alternating arrangement about the cavity 20. In other words, a hinge 30 is disposed between adjacent walls, i.e., a hinge 30 is disposed between the top wall 22 and each side wall 26, 28, respectively, and a hinge 30 is disposed between the bottom wall 24 and each side wall 26, 28, respectively.

The beam 14 may include a fifth wall 66, i.e., a dividing wall, extending from the top wall 22 to the bottom wall 24 and dividing the cavity 20 into a first portion 68 and a second portion 70. A hinge 30 is disposed between the dividing wall 66 and the top wall 22, and a hinge 30 is disposed between the dividing wall 66 and the bottom wall 24. The dividing wall 66 may add rigidity to the beam 14 when the beam 14 is in the expanded position. In the alternative to the rectangular shape shown in the Figures, the beam 14 may have any suitable shape.

The beam 14 extends from the pair of wedges 54 to the second pair of wedges 56. In particular, one of the pair of wedges 54 may be disposed in the first portion 68 of the cavity 20 one of the second pair of wedges 56 may be disposed in the first portion 68 of the cavity 20. Likewise, the other of the pair of wedges 54 may be disposed in the second portion 70 of the cavity 20 and the other of the second pair of wedges 56 may be disposed in the second portion 70 of the cavity 20.

The top wall 22 of the beam 14 may extend in parallel with the first surfaces 60 of the wedges 32. Specifically, the top wall 22 of the beam 14 may abut the first surfaces 60. When the wedges 32 are forced into the cavity 20 to move the beam 14 from the collapsed position to the expanded position, the first surface 60 slides along the top wall 22 and the wedge surfaces 58 slide along the bottom wall 24 to rotate the walls 22, 24, 26, 28 about the hinges 30 to move the beam 14 from the collapsed position to the expanded position.

The beam 14 may be supported on the wedges 32. The beam 14 may rest on the wedges 32 when the beam 14 is in the collapsed position and may be retained between the rails 40, 42 by engagement of the corners 64 with the cavity 20. Specifically, as shown in FIGS. 5A-B, the top wall 22 may be supported on the first surfaces 60 and the side walls 26, 28 and the bottom wall 24 may be supported by the top wall 22 on the wedges 32, i.e., may hang downwardly from the top wall 22. The beam 14, e.g., the top wall 22, may be attached to the wedges 32 with a frangible connection, e.g., by a tack weld, frangible bond, frangible fastener, etc. Alternatively, or in addition, the beam 14, e.g., the top wall 22, may be attached to the rails 40, 42 with a frangible connection, e.g., by a tack weld, frangible bond, frangible fastener, etc.

The beam 14 may, for example, be formed of metal, such as aluminum. As another example, the beam 14 may be formed of carbon fiber reinforced polymer (CFRP). Alternatively, the beam 14 may be formed of steel, plastic, or any other suitable material.

The battery 38 may be disposed above the beam 14. As set forth further below, the beam 14 may increase the structural rigidity of the frame 36 of the vehicle when the beam 14 is in the expanded position to reduce the likelihood of intrusion into the battery compartment 72.

With reference to FIGS. 6-8, the hinges 30 allow the walls 22, 24, 26, 28 to rotate relative to each other to allow the beam 14 to open from the collapsed position to the expanded position when the wedge 32 is forced between the walls 22, 24, 26, 28. The beam 14 of FIGS. 6-8 includes four hinges 30 at the intersections of the top wall 22, side walls 26, 28, and bottom wall 24, respectively. The beam 14 of FIGS. 6-8 also includes hinges 30 between the dividing wall 66 and the top wall 22 and between the dividing wall 66 and the bottom wall 24. The hinges 30 may be spring loaded (not shown) to bias the beam 14 toward the collapsed position during normal operation.

Each hinge 30, for example, may include a hollow member 74 connected to one of the walls 22, 24, 26, 28 and an inner member 76 connected to another of the walls 22, 24, 26, 28. Specifically, each wall 22, 24, 26, 28 includes one hollow member 74, which receives an inner member 76 of an adjacent wall 22, 24, 26, 28 to define one hinge 30, and one inner member 76, which is received in a hollow member 74 of an adjacent wall to define another hinge 30. The inner member 76 of each hinge 30 is rotatably disposed within the hollow member 74 of that hinge 30. The hollow member 74 and the inner member 76 may be cylindrical, as shown in FIGS. 6-8 and the hollow member 74 may extend annularly about the inner member 76. In the alternative to the hollow member 74 and the inner member 76, the hinge 30 may be of any suitable configuration.

The hollow member 74 defines a slot 78 through which the wall 22, 24, 26, 28 connected to the inner member 76 extends, as best shown in FIG. 7. The slot 78 of each hollow member 74 may extend from the first end 16 to the second end 18 of the beam 14.

With continued reference to FIGS. 6-8, the hinges 30 may be configured to stop in the expanded position. For example, the hollow member 74 may include an inward protrusion 80 and the inner member 76 may include an outward protrusion 82 configured to contact the inward protrusion 80 in the expanded position. Specifically, the hollow member 74 may include four inward protrusions 80 spaced from each other by approximately 90°. The inner member 76 includes two outward protrusions 82 spaced from each other by approximately 180° with the wall connected to the inner member 76 disposed approximately 90° from each of the outward protrusions 82. The slot 78 may extend between two inward protrusions 80.

With reference to FIGS. 6 and 7, when the beam 14 is in the collapsed position, the outward protrusions 82 contact the inward protrusions 80 and the wall 22, 24, 26, 28 connected to the inner member 76 contacts the inward protrusion 80 at the slot 78. When the beam 14 moves to the expanded position, as shown in FIG. 8, the hollow member 74 and the inner member 76 rotate approximately 90°, e.g., clock-wise as shown in FIGS. 6-8, relative to each other until the outward protrusions 82 and inward protrusions 80 contact each other in the position shown in FIG. 8. The contact between the inward protrusions 80 and the outward protrusions 82 prevents further rotation of the hinges 30 and walls to stop rotation the hinges 30 and walls in the expanded position. In other words, the inward protrusions 80 and the outward protrusions 82 act as stops to stop movement of the beam 14 in the expanded position.

With reference to FIG. 8, for each hinge 30, the wall 22, 24, 26, 28 connected to the inner member 76 may abut the hollow member 74 in the slot 78 in the expanded position to prevent further rotation of the hinges 30 and walls 22, 24, 26, 28 to stop the beam 14 in the expanded position. In the Figures, this abutment of the inner member 76 in the slot 78 operates in conjunction with the abutment of the inward protrusions 80 and outward protrusions 82. However, it should be appreciated that the abutment of this wall 22, 24, 26, 28 with the hollow member 74 in the slot 78 may be used in addition to, or in the alternative to, the inward protrusions 80 and outward protrusions 82. In other words, the wall 22, 24, 26, 28 may be designed without the inward protrusions 80 and the outward protrusions 82 such that rotation of the walls 22, 24, 26, 28 and hinges 30 is stopped in the expanded position only by contact between the wall 22, 24, 26, 28 connected to the inner member 76 with the hollow member 74 in the slot 78.

In operation, the beam 14 is maintained in the collapsed position as the vehicle is operated under normal conditions. As such, under normal conditions, the device 10 has a small profile, i.e., consumes little space.

In the event of a side impact of sufficient magnitude to bend the rail 40, 42, as shown in FIG. 5B, the beam 14 forces the wedges 32 into the cavity 20. Specifically, as the rail 40, 42 bends, each of the pair of wedges 32 are forced into to the cavity 20 at the first end 16 and each of the second pair of wedges 32 are forced into the cavity 20 at the second end 18. As the wedge surfaces 58 slide along the bottom wall 24 of the beam 14, the wedge surfaces 58 force the bottom wall 24 downwardly away from the top wall 22. During the downward movement of the bottom wall 24, the side walls 26, 28 and the dividing wall 66 rotate relative to the top wall 22 and the bottom wall 24 at the hinges 30. The top wall 22 may remain stationary relative to the rails 40, 42 as the bottom wall 24 moves downwardly away from the top wall 22. When the beam 14 reaches the expanded position, the inward protrusions 80 and outward protrusions 82 contact each other to prevent further relative rotation of the walls 22, 24, 26, 28 to stop the beam 14 in the expanded position.

In the expanded position, the beam 14 reinforces the rails 40, 42, i.e., transfers force from the deforming rail 40, 42 to the other rail 40, 42, to resist further deformation of the rail 40, 42. Since the wedges 32 move the rail 40, 42 from the collapsed position to the expanded position as the rail 40, 42 deforms, the response of the device 10 to reinforce the rails 40, 42 is immediate upon initial deformation of one of the rails 40, 42.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle chassis comprising:
   a pair of rails spaced from each other;
   a beam disposed between the pair of rails and defining a cavity;
   the beam including walls and hinges connected in alternating arrangement about the cavity, each hinge being connected to two of the walls; and
   a wedge disposed between one of the rails and the beam adjacent the cavity;
   wherein the wedge extends between the walls.

2. The vehicle chassis as set forth in claim 1 wherein the wedge includes a first surface extending in parallel with one of the walls and a wedge surface extending transversely from the first surface.

3. The vehicle chassis as set forth in claim 2 wherein the first surface and the wedge surface are disposed between the walls.

4. The vehicle chassis as set forth in claim 2 wherein the first surface and the wedge surface intersect at an acute corner.

5. The vehicle chassis as set forth in claim 1 wherein each hinge includes a hollow cylindrical member connected to one of the walls and an inner cylindrical member connected to another of the walls and rotatably disposed within the hollow cylindrical member.

6. The vehicle chassis as set forth in claim 5 wherein the hollow cylindrical member includes an inward protrusion and the inner cylindrical member includes an outward protrusion configured to contact the inward protrusion.

7. The vehicle chassis as set forth in claim 1 wherein the wedge is fixed to the rail.

8. The vehicle chassis as set forth in claim 1 further comprising a second wedge disposed between the other rail and the beam adjacent the cavity.

9. The vehicle chassis as set forth in claim 8 wherein the beam extends from the wedge to the second wedge.

10. The vehicle chassis as set forth in claim 1 further comprising a battery disposed above the beam.

11. A deployable reinforcing device comprising:
a beam extending from a first end to a second end and defining a cavity extending from the first end to the second end;
the beam including walls and hinges connected in alternating arrangement about the cavity, each hinge being connected to two of the walls; and
a wedge disposed at the first end of the beam adjacent the cavity;
wherein the wedge extends between the walls.

12. The deployable reinforcing device as set forth in claim 11 wherein the wedge includes a first surface extending in parallel with one of the walls and a wedge surface extending transversely from the first surface.

13. The deployable reinforcing device as set forth in claim 12 wherein the first surface and the wedge surface are disposed between the walls.

14. The deployable reinforcing device as set forth in claim 12 wherein the first surface and the wedge surface intersect at an acute corner.

15. The deployable reinforcing device as set forth in claim 11 wherein each hinge includes a hollow member connected to one of the walls and an inner member connected to another of the walls and rotatably disposed within the hollow member.

16. The deployable reinforcing device as set forth in claim 15 wherein the hollow member includes an inward protrusion and the inner member includes an outward protrusion configured to contact the inward protrusion.

17. The deployable reinforcing device as set forth in claim 11 further comprising a second wedge disposed at the second end of the beam adjacent the cavity.

18. The deployable reinforcing device as set forth in claim 17 wherein the beam extends from the wedge to the second wedge.

19. A vehicle chassis comprising:
a pair of rails spaced from each other;
a beam disposed between the pair of rails and defining a cavity;
the beam including walls and hinges connected in alternating arrangement about the cavity, each hinge being connected to two of the walls; and
a wedge disposed between one of the rails and the beam adjacent the cavity;
wherein each hinge includes a hollow cylindrical member connected to one of the walls and an inner cylindrical member connected to another of the walls and rotatably disposed within the hollow cylindrical member.

20. The vehicle chassis as set forth in claim 19 wherein the hollow cylindrical member includes an inward protrusion and the inner cylindrical member includes an outward protrusion configured to contact the inward protrusion.

* * * * *